United States Patent [19]

Tamura et al.

[11] Patent Number: 4,556,623
[45] Date of Patent: Dec. 3, 1985

[54] ELECTROCONDUCTIVE POROUS FILM AND PROCESS FOR PRODUCING SAME

[75] Inventors: Shohei Tamura, Kanagawa; Sadamitsu Sasaki, Osaka; Takeshi Sasaki, Osaka; Hisashi Ichinose, Osaka; Keiji Nakamoto, Osaka; Masao Abe, Osaka; Hitoshi Nakazawa, Osaka, all of Japan

[73] Assignee: Nitto Electric Industrial Co., Ltd., Osaka, Japan

[21] Appl. No.: 688,119

[22] Filed: Dec. 31, 1984

[30] Foreign Application Priority Data

Dec. 30, 1983 [JP] Japan ................................ 58-252135
Jan. 11, 1984 [JP] Japan .................................. 59-4121
Jan. 11, 1984 [JP] Japan .................................. 59-4122
Nov. 1, 1984 [JP] Japan ................................ 59-231848

[51] Int. Cl.$^4$ ............................................. G03G 5/07
[52] U.S. Cl. ....................................... 430/83; 430/70; 430/73; 430/133
[58] Field of Search ................... 430/70, 73, 83, 133, 430/127

[56] References Cited

U.S. PATENT DOCUMENTS 4,405,704 9/1983 Watarai et al. ..................... 430/83

Primary Examiner—John L. Goodrow
Attorney, Agent, or Firm—Sughrue, Mion, Zinn, Macpeak & Seas

[57] ABSTRACT

An electroconductive porous film is described comprising a porous film substrate having deposited thereon an electroconductive organic polymer containing an electron acceptor as a doptant, substantially comprising a linear polymer having as a main repeating unit thereof a quinonediimine structure represented by formula (III).

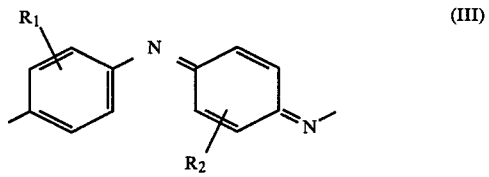

(III)

wherein $R_1$ and $R_2$, which are the same or different, each represents a hydrogen atom or an alkyl group.

13 Claims, 9 Drawing Figures

ELECTROCONDUCTIVE POROUS FILM AND PROCESS FOR PRODUCING SAME

FIELD OF THE INVENTION

This invention relates to a novel electroconductive porous film and a process for producing same.

BACKGROUND OF THE INVENTION

It is known to produce a conductive sheet by mixing conductive amorphous carbon, graphite, metal powder, or the like with rubber or resin, and molding the mixture by extrusion, compression, rolling, or other techniques, or, alternatively, by depositing a conductive metal on the surface of a rubber or resin sheet by vacuum vapor deposition, sputtering deposition, etc.

However, taking the former method as an example, it is generally difficult to obtain a sufficient degree of electroconductivity, because there is unavoidably a certain limitation on the amount of a conductive substance that can be added in order that a mixture of rubber or resin with such conductive substance may be successfully molded into a sheet form. On the other hand, a wet process is also known for producing a porous film, comprising casting a solution of a film-forming resin in a water-miscrible organic solvent onto a suitable support and immersing the same in water. However, a similar limitation exists on the amount of the conductive substance that can be incorporated in this process as well, when such substance is to be incorporated in the resin solution, with the result that a sufficiently conductive porous film cannot be easily produced by such a process.

In the latter method, even if the surface of the sheet can be rendered conductive, the sheet is generally insulating in the thickness direction. Moreover, if one is to produce a flexible conductive sheet, the deposition thickness of the conductive metal must be limited in order that the flexibility of the support sheet may be retained, with the result that the electroconductivity of the product sheet is also limited to within a certain range.

Some of the products of the oxidative polymerization of aniline, e.g., aniline black, have long been known. Particularly, as an intermediate in the production of aniline black, the octamer of aniline represented by formula (I) has been identified as emeraldine (A. G. Green et al., *J. Chem. Soc.*, Vol. 97, p. 2388 (1910), ibid., Vol. 101, p. 1117 (1912)). This octamer is soluble in 80% acetic acid, cold pyridine, and N,N-dimethylformamide.

The emeraldine is oxidized in an ammoniacal medium to form nigraniline, represented by formula (II), which is also known to possess solubility similar to that of emeraldine.

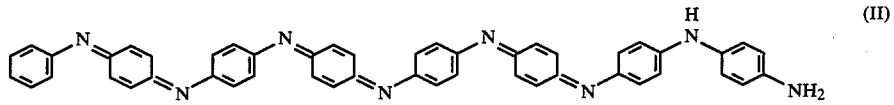
(II)

It has been demonstrated by R. Buvet et al that the sulfate of emeraldine possesses high electroconductivity (*J. Polymer Sci.*, C, Vol. 16, pp. 2931, 2943 (1967), ibid., Vol. 22, p. 1187 (1969)).

It has been also demonstrated that an organic substance similar to emeraldine can be obtained by electro-oxidative polymerization of aniline (D. M. Mohilner et al., *J. Amer. Chem. Soc.*, Vol. 84, p. 3618 (1962)). According to this publication, a substance soluble in 80% acetic acid, in pyridine, and in N,N-dimethylformamide can be obtained when an aqueous sulfuric acid solution of aniline is subjected to electro-oxidative polymerization using a platinum electrode at an oxidation potential of +0.8 V relative to the standard calomel electrode, a level necessary for avoiding electrolysis of water.

In addition to the reports mentioned above, Diaz et al. (*J. Electroanal. Chem.*, Vol. 111, p. 111 (1980)) and Oyama et al. (*Polymer Preprints, Japan*, Vol. 30, No. 7, p. 1524 (1981), *J. Electroanal Chem.*, Vol. 161, p. 339 (1984)) have also studied electro-oxidative polymerization of aniline. These latter studies were aimed at polymer coated chemically modified electrodes where the electrolysis is conducted at potentials not exceeding 1 V.

There are already known various electroconductive organic polymers, but as a general tendency these polymers are lacking in stability. For example, while polyacetylene is theoretically a very interesting electroconductive organic polymer, it is so susceptible to oxidation that it quickly undergoes oxidative degradation in air, considerably altering its properties. In the doped state, it is still more sensitive to oxidation, and its electroconductivity suffers a rapid decrease in the presence of even a small quantity of moisture in the atmosphere. This tendency is particularly pronounced in the case of n-type semiconductors.

SUMMARY OF THE INVENTION

It is a general object of this invention to provide an electroconductive porous film. More particularly, this invention has as its object to provide a novel electroconductive porous film by direct deposition of a novel electroconductive organic polymer on a porous substrate film.

Research undertaken by the present inventors to overcome the disadvantages of earlier electroconductive resin sheets, and to impart electroconductivity to a resin sheet, and particularly to a porous film, has led to the discovery that an oxidation polymer of aniline obtainable with the use of a chemical oxidizing agent or an electro-oxidation polymer of aniline, each produced under a predetermined set of conditions, can be pre-

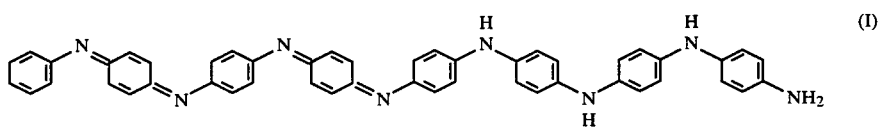
(I)

doped in the process of polymerization so as to ensure a specifically high, stable electroconductivity and that a highly electroconductive porous film can be produced by providing that said predoped polymer is directly deposited on a porous substrate film.

More particularly, based on the present inventors' extensive studies, especially on the oxidative polymerization of aniline for the purpose of developing stable organic materials possessing high electroconductivity, and particularly for electroconductive organic polymers, it has now been found that, by selecting the reaction conditions of the oxidative polymerization of aniline, a highly electroconductive polymer can be obtained, possessing a far higher molecular weight than the above-described emeraldine, and that said polymer exhibits stability without an additional doping step because it has already undergone doping during the course of the oxidative polymerization.

Based on the above findings and information, the present inventors extensively studied the conditions necessary for the manufacture of a desirable electroconductive porous film, and found that the aforementioned oxidation polymer of aniline is a substantially linear high polymer comprising a quinonediimine structure as a main repeating unit and that a conductive porous film which is highly electroconductive, and which, when the substrate porous support is flexible, retains that flexibility, can be easily manufactured by a process in which the afore-mentioned electroconductive oxidation polymer of an aniline compound as obtainable with a chemical oxidizing agent is directly deposited on a porous substrate film, by a process in which said electro-oxidation polymer of aniline compound is deposited on a porous substrate film using the latter as a positive electrode, or by a combination process thereof.

Accordingly, the electroconductive porous film according to this invention comprises a porous substrate film having deposited thereon an electroconductive polymer containing an electron acceptor as a dopant, said polymer being a substantially linear polymer having as a main repeating unit thereof a quinonediimine structure represented by formula (III).

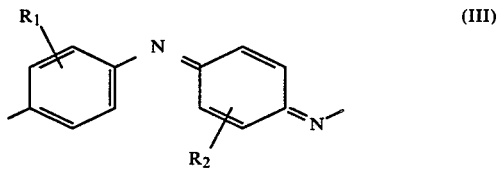

(III)

wherein $R_1$ and $R_2$, which are the same or different, each represents a hydrogen atom or an alkyl group.

DETAILED DESCRIPTION OF THE INVENTION

Figure 1:
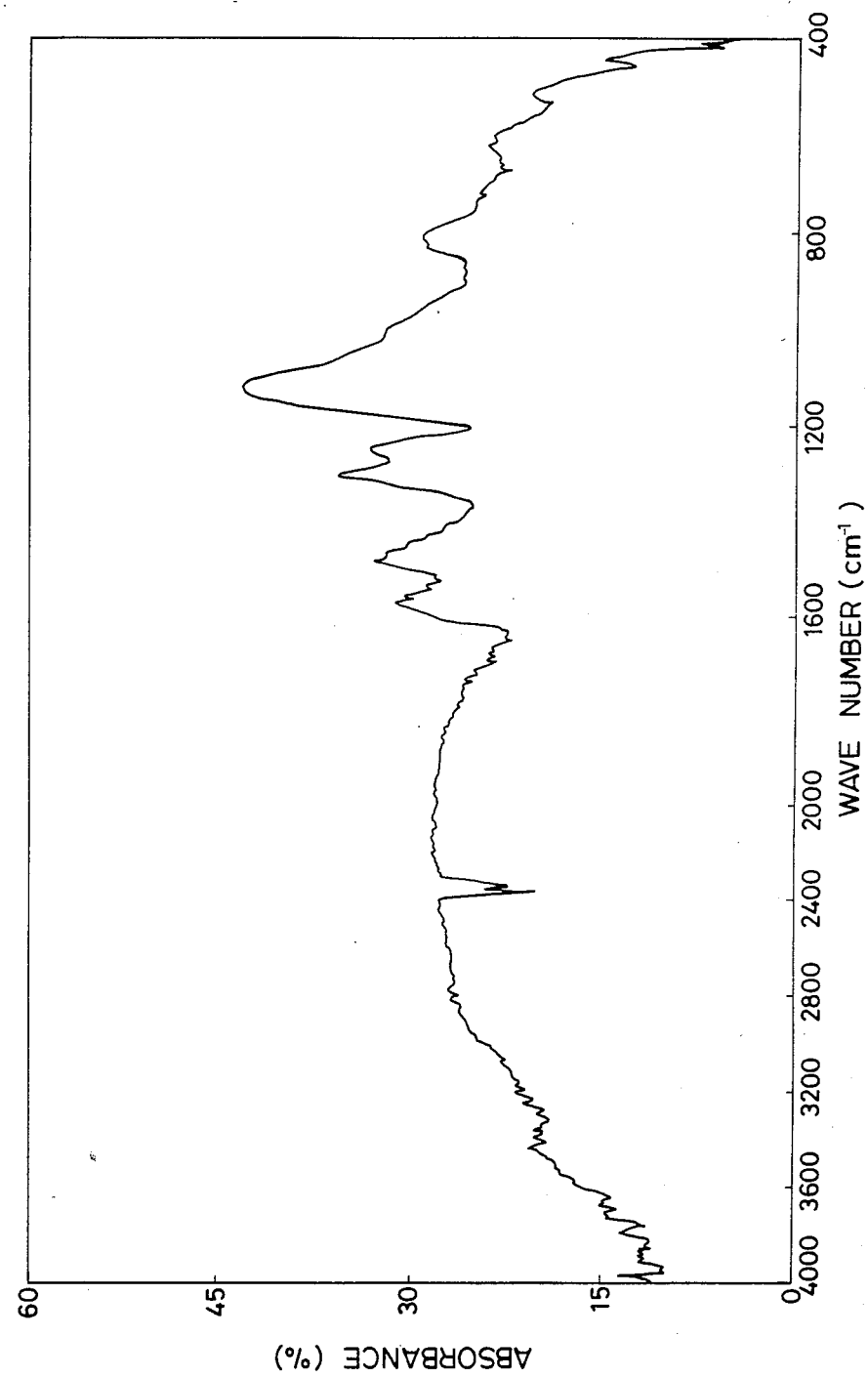
FIG. 1 is an infrared absorption spectrum of an electroconductive organic polymer according to this invention obtained by chemical oxidation.

The term "compensation" as used herein refers to an operation in which carriers (i.e., electrons and positive holes) are removed from electroconductive polymers. When the carrier is an electron, i.e., when an n-type semiconductor is used an electron acceptor is employed to remove or compensate the electron. On the other hand, compensation is carried out with an electron donor when the carrier is a positive hole, i.e., when a p-type semiconductor is used. It is also possible to compensate semiconductors or electroconductive polymers by giving thereto and taking therefrom electrons electrochemically.

Referring, first, to the novel electroconductive polymer as a constituent member of the electroconductive porous film according to this invention, this electroconductive polymer can be obtained as an independent product by preparing an electroconductive porous film in accordance with the method described hereinafter and detaching the desired polymer from the substrate film or by polymerizing an aniline compound with a chemical oxidizing agent or under electro-oxidation conditions in the absence of a substrate or support.

The term "aniline compound" as used herein means aniline and alkylanilines having 1 or 2 carbon atoms in the alkyl moiety.

The electroconductive oxidation polymer of an aniline compound according to this invention generally has an appearance of a green to blackish green color in a dry powdery form. Generally, this green color gains in brightness as the degree of electroconductivity increases. However, a shaped product of the polymer produced by compression molding generally has a glossy blue color.

The electroconductive organic polymer in the electroconductive porous film of the present invention obtainable by a chemical oxidation process described hereinafter is insoluble in water and virtually all organic solvents, but is normally slightly to partially soluble in 97% sulfuric acid. On the other hand, the electroconductive organic polymer obtainable by the electro-oxidation technique described hereinafter is normally substantially insoluble even in 97% concentrated sulfuric acid but depending on reaction conditions used, can include a moiety which is slightly soluble in 97% concentrated sulfuric acid. The solubility of the polymer in 97% concentrated sulfuric acid varies depending upon the method of the reaction and the conditions of the reaction used for the polymer formation. The electroconductive organic polymer obtained by oxidative polymerization of an aniline compound with a chemical oxidizing agent generally has a solubility in the range of from 0.2 to 10% by weight, and in most cases, in the range of from 0.25 to 5% by weight. The term "solubility" as used herein, particularly with respect to polymer of high molecular weight, is to be interpreted to be such that polymer contains a portion having a solubility in the above-described range. The polymer according to this invention thus sharply contrasts with emeraldine which is soluble, as described above, in 80% acetic acid, in cold pyridine, and in N,N-dimethylformamide.

The polymer of the present invention obtainable by the chemical oxidation, when dissolved in 97% concentrated sulfuric acid at a concentration of 0.5 g/dl (gram/deciliter), possesses a logarithmic viscosity number in the range of from 0.1 to 1.0, and in most cases, in the range of from 0.2 to 0.6. The term "logarithmic viscosity number" as used herein particularly with respect to a polymer of high molecular weight, is to be interpreted so that the portion of the polymer soluble in 97% concentrated sulfuric acid falls in the range described above. The logarithmic viscosity number ($\eta$ inh) is well known in the art and can be determined by the following formula:

$$\eta \text{ inh} = \frac{\ln \frac{t}{t_o}}{C}$$

wherein:
"$t_o$" is the falling time (sec.) of a solvent alone, determined by an Ostwald viscometer;
"t" is the falling time (sec.) of a polymer solution in the same solvent, determined by an Ostwald viscometer;
"C" is the concentration of the above polymer solution (g/dl);
"ln" is the natural logarithm.

For comparison, the logarithmic viscosity numbers of emeraldine and aniline black determined under the same conditions are, respectively, 0.02 to 0.005, signifying that the polymer according to the present invention obtainable by the chemical oxidation has a high molecular weight. Further, the results of differential thermal analysis also indicate that the polymer according to the present invention obtainable by the chemical oxidation is a polymer having high molecular weight.

The difference in solubility in 97% concentrated sulfuric acid between the electroconductive polymer according to this invention that is obtainable by chemical oxidation and that obtainable by electro-oxidation is due, presumably for the most part, to a difference in molecular weight, for their infrared absorption spectra, elemental analyses, etc., suggest that these polymers are substantially identical. Thus, though both are found by differential thermal analysis to be high polymers, the polymer by the electro-oxidation process is thought to be a polymer having larger molecular weight.

Figure 2:
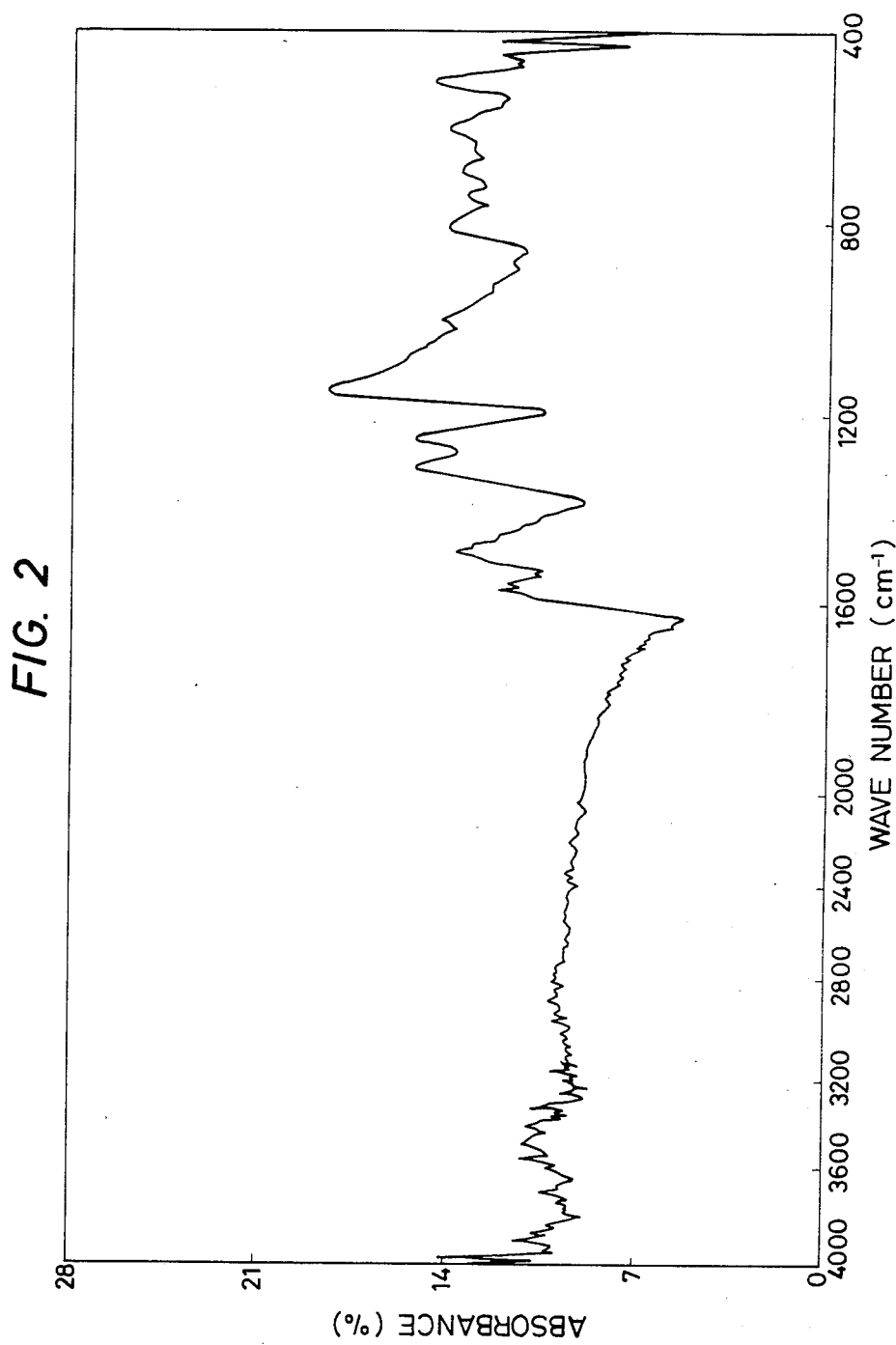
FIGS. 2 and 3 are the infrared absorption spectra of emeraldine and aniline black, respectively.
Figure 3:
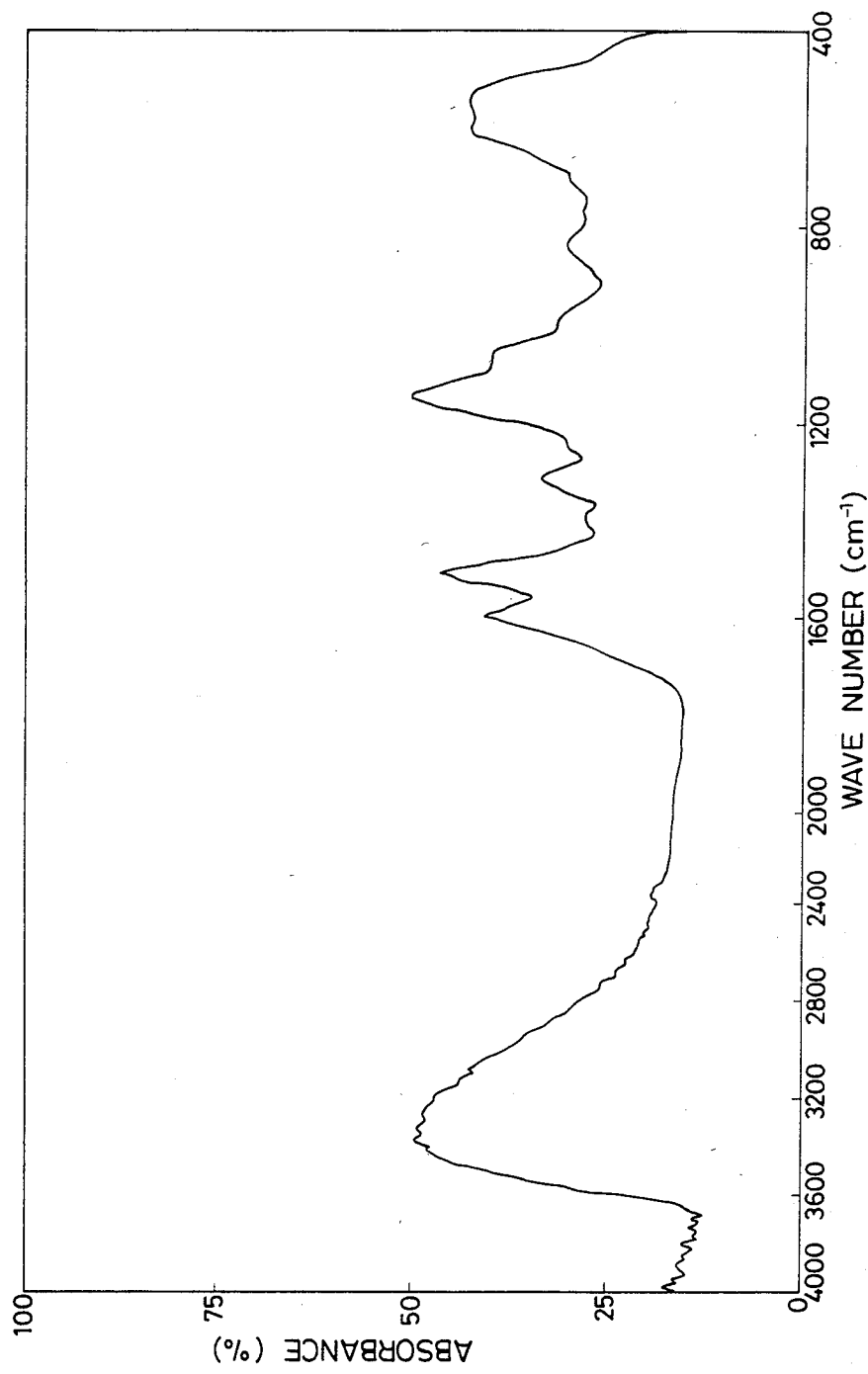

The infrared absorption spectrum obtained of an electroconductive polymer produced as a typical polymer by the oxidative polymerization of aniline is shown in FIG. 1. For comparison, the infrared absorption spectra obtained of emeraldine and aniline black (commercially available as a pigment under the trademark designation "Diamond Black") are shown respectively in FIG. 2 and FIG. 3.

The electroconductive polymer prepared by the chemical oxidation process and that prepared by the electro-oxidation process are in agreement with each other in infrared absorption spectrum and their elemental analyses also suggest that they have the same chemical structure. Therefore, the following discussion on the conductive polymer obtainable by the chemical oxidation process applies to the polymer obtainable by the electro-oxidation process as well.

The infrared absorption spectrum of the electroconductive polymer according to this invention somewhat resembles that of emeraldine. However, in the infrared absorption spectrum of the polymer in this invention, the absorption due to the deformation vibration outside the C-H plane of a mono-substituted benzene clearly recognized in emeraldine is not substantially observed, and the absorption due to a para-substituted benzene is relatively high. The absorption spectrum of the polymer in this invention differs widely from that of aniline black. The polymer of the present invention, accordingly, appears to possess a somewhat emeraldine-like structure, containing a number of para-substituted benzene rings.

The polymer in this invention is doped with an electron acceptor which is present in the polymerization system during the course of the oxidative polymerization of an aniline compound. As a result, it possesses high electroconductivity. In this polymer, therefore, electron transfers from the polymer to the electron acceptor and a charge transfer complex is formed between the polymer and the electron acceptor. When the polymer in this invention is molded in the shape of a disk, for example, and a pair of electrodes are fixed on the disk and a temperature difference is produced between the electrodes to give rise to thermal electromotive force peculiar to a semiconductor, a positive electromotive force is generated on the electrode of the low temperature side, and a negative electromotive force on the electrode of high temperature side. This fact indicates that the polymer used in this invention is a p-type semiconductor.

Figure 4:
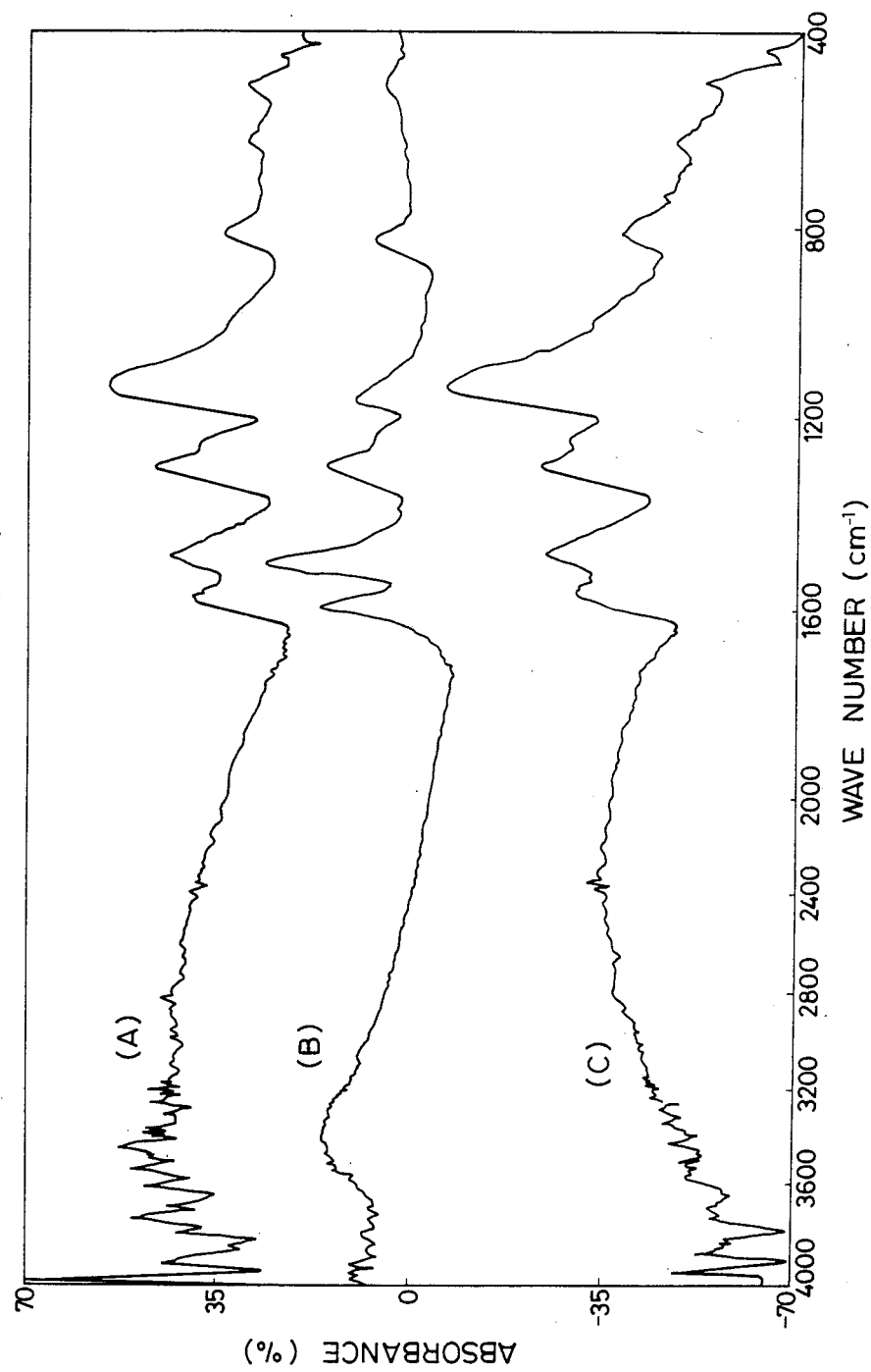
FIG. 4 shows spectral changes upon chemical compensation of the electroconductive polymer obtained by chemical oxidation, wherein A represents the IR absorption spectrum of the polymer according to this invention, B is that of the ammonia-compensated polymer, and C is that of the polymer of B as re-doped with sulfuric acid.

When the polymer in this invention is chemically compensated with ammonia, it undergoes significant loss of electroconductivity and changes its appearance from a blackish green color to a purple color. If this polymer is then doped with an electron acceptor such as sulfuric acid, the original high electroconductivity is restored, as well as the original blackish green color. This change is reversible. If the chemical compensation and the doping are repeated, the same results can be obtained repeatedly. The changes in the polymer appearing in the infrared absorption spectrum as a consequence of the chemical compensation and doping are illustrated in FIG. 4. In FIG. 4, the curve A represents the spectrum of the polymer in the unaltered form, the curve B the spectrum of the polymer in the chemically compensated form, and the curve C the spectrum of the polymer in the doped form. Evidently, the spectrum of C agrees substantially completely with the spectrum of A. This fact indicates that the above chemical compensation and doping cause no change in the skeletal structure of the polymer, but induce transfer of electrons between the polymer and the chemical compensation reagent or the electron acceptor. It is, accordingly, understood that owing to the mechanism described above, the polymer in this invention is doped with the electron acceptor during the course of the oxidative polymerization, and as a result, the polymer contains a dopant.

Examples of the dopant which the electroconductive polymer in this invention can contain include halogens such as chlorine, bromine, and iodine, Lewis acids such as ferric chloride, tin tetrachloride, and copper dichloride, inorganic acids such as hydrogen chloride, hydrogen bromide, sulfuric acid, and nitric acid, and organic acids such as picric acid, and p-toluenesulfonic acid. Of course, the foregoing list of dopants is only exemplary, and dopants useful according to the present invention are not limited thereto.

The chemical structure of the electroconductive polymer in this invention is confirmed by the elementary analysis of the polymer itself and also by the elementary analysis of the polymer produced by chemically compensating the original polymer with ammonia (hereinafter referred to as a "compensated polymer"). The polymer is a linear high molecular polymer substantially of the above-described repeating unit (III). It is believed to acquire high electroconductivity because the $\pi$ electron conjugate system of the polymer contains the dopant.

Optionally, the electroconductive organic polymer in this invention may contain, in conjunction with the above repeating unit of quinonediimine structure, a repeating unit represented by formula (IV)

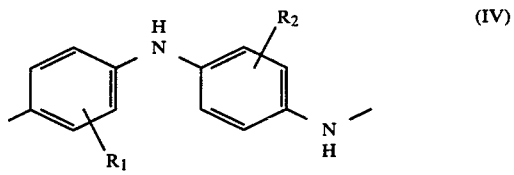

(IV)

which is a reduced form of formula (III), again wherein $R_1$ and $R_2$, which are the same or different, each represents a hydrogen atom or an alkyl group. The polymer containing such a reduced structure can be easily produced, for example, by partially reducing the polymer of this invention. After the polymer comprising a repeating unit of formula (IV) is produced by reduction, the electroconductive organic polymer in this invention can also be obtained by oxidizing and simultaneously doping the reduced polymer with an oxidizing agent which is effective as an electron acceptor.

As described above, the electroconductive organic polymer produced by the oxidative polymerization of an aniline compound preferably comprises as the main repeating unit the above repeating unit (III). Since this polymer has already been doped with a protonic acid during the course of the oxidative polymerization, it possesses high electroconductivity without requiring an additional doping treatment, and the electroconductivity of the polymer is retained even when the polymer is left standing in the atmosphere for a long time. Compared with the doped electroconductive organic polymers heretofore known to the art, the polymer in this invention possesses high stability.

The processes for producing an electroconductive porous film in accordance with this invention will now be described in more detail. The electroconductive porous film according to this invention can be produced by chemical oxidation, electro-oxidation or a combination thereof.

Reference is first made to the chemical oxidation process in which an electroconductive oxidation polymer of an aniline compound as obtainable with the use of a chemical oxidizing agent is deposited on a porous substrate film.

Preferably, alkylanilines can be used as the aniline compound. Preferred examples of the alkylaniline include o-methylaniline, m-methylaniline, o-ethylaniline, and m-ethylaniline. Of aniline and these alkylanilines, aniline is particularly preferred since it produces a polymer of high electroconductivity.

The porous substrate film to be used in the deposition of a chemical oxidation polymer of an aniline compound should have sufficient porosity and wettability to be impregnated with a solution of the aniline compound or the water-soluble salt thereof. To ensure these requirements, one approach is to employ a solvent capable of wetting the porous substrate film in dissolution of the aniline compound or the water-soluble salt thereof. Another approach is that of imparting wettability to the substrate with respect to the aniline solution by carrying out a surface treatment such as sputter etching, irradiation with ultra-violet light or electron rays, corona discharge, alkali metal treatment, etc.

When the porous substrate film is sufficiently wettable with an aniline compound, for instance, the film may be directly impregnated with the aniline compound or a solution thereof in an organic solvent. When the substrate film is hydrophilic, it can be impregnated with an aqueous solution of a water-soluble salt of aniline. Such hydrophilic salts of the aniline compound include, among others, the hydrochloride, sulfate, perchlorate, nitrate, hydrobromide, borofluoride, fluorophosphate, etc.

However, when the substrate film is not sufficiently wettable with an aniline compound or an aqueous solution thereof, as it is in the case with a porous film of polytetrafluoroethylene, it is possible to dissolve the aniline compound or the water-soluble salt thereof in an organic solvent having affinity for polytetrafluoroethylene, such as ethanol, and impregnate the film with the resulting solution. If the solvent is oxidizable with the oxidizing agent in the impregnation of the substrate film with the solution of the aniline compound or the water-soluble salt thereof, it is preferable to dry the impregnated film to remove the solvent.

There is virtually no limitation on the material of the porous substrate film, and it can be selected according to the intended use of the product electroconductive porous film. Thus, ethylene-vinyl acetate copolymer, cellulose derivatives, ethylene-vinyl alcohol copolymer, fluorine-containing resins such as polytetrafluoroethylene, polyvinylidene fluoride, etc., polysulfones, polyethersulfones, polymides, polyamides, etc., may be mentioned by way of example.

In particularly desirable procedure for the production of the electroconductive porous film by the chemical oxidation, an aniline compound or its water-soluble salt is impregnated in a porous film and the thus-impregnated porous film is subjected to oxidative polymerization with an oxidizing agent in a protonic acid-containing reaction medium to produce an electroconductive polymer in such a manner that the molar ratio of protonic acid/potassium dichromate in the reaction medium is adjusted to at least 1.2/1, and preferably from 2/1 to 50/1, thus obtaining an electroconductive porous film having an electroconductivity of at least $10^{-6}$ S/cm.

In the above process, the porous film carrying an aniline compound or a water-soluble salt thereof is immersed in an oxidizing aqueous solution containing a protonic acid and an oxidizing agent whereby the aniline compound is oxidation-polymerized by the oxidizing agent to deposit a conductive polymer on the porous film. Therefore, the conductive oxidation polymer is deposited on the surface of the porous film inclusive of the surfaces of the walls defining the pores of the film, thus providing a generally electroconductive porous film.

There is no particular limitation on the oxidizing agent that can be employed, but chromium oxide (IV) or a dichromate such as potassium dichromate, sodium dichromate, or the like is preferred. Particularly, potassium dichromate is desirable. However, chromium oxidizing agents such as chromic acid, chromates, chromyl acetate, etc., and manganese oxidizing agents such as potassium permanganate, etc., can also be employed if desired.

Examples of the protonic acid which can be used include sulfuric acid, hydrochloric acid, hydrobromic acid, tetrafluoroboric acid ($HBF_4$), and hexafluorophosphoric acid ($HPF_6$), with sulfuric acid being most preferred. When a mineral acid is used for the formation of the water-soluble salt of aniline compound, this mineral acid may be the same as or different from the above-described protonic acid.

Examples of the reaction medium include water, organic solvents miscible with water, and organic solvents not miscible with water, and mixtures thereof. When a water-soluble salt of an aniline compound is used, the reaction medium to be used is generally water, an organic solvent miscible with water, or a mixture thereof which is capable of dissolving the water-soluble salt. When an aniline compound itself is used, the reaction medium can be either an organic solvent miscible with water or an organic solvent not miscible with water which is capable of dissolving the aniline compound. It is important that the organic solvent to be used as the reaction medium should not be oxidized by the oxidizing agent used in the reaction. Examples of organic solvents miscible with water include ketones, ethers, and organic acids such as acetone, tetrahydrofuran, and acetic acid, and examples of organic solvents not miscible with water include carbon tetrachloride and hydrocarbons.

The concentration of the protonic acid in the aqueous solution of oxidizing agent is not particularly limited. Generally, however, this concentration is in the range of from 1 to 10 N. In the chemical oxidation, the protonic acid may be impregnated together with aniline or the water-soluble salt of the aniline compound in the porous film prior to effecting the reaction.

The reaction temperature for the oxidative polymerization to deposit an electroconductive polymer on a porous film substrate according to the chemical oxidation is not particularly limited as long as it does not exceed the boiling point of the solvent to be used. The electroconductivity of the oxidation polymer obtained tends to decrease with the increasing reaction temperature. From the standpoint to produce a polymer having a high electroconductivity, the reaction temperature is desirably below room temperature. When the porous film comes in contact with an aqueous solution of an oxidizing agent, usually the deposition reaction of the polymer is quickly completed. Then, the porous film having deposited thereon a polymer is poured into a large volume of water or an organic solvent, and is washed with water until the filtrate becomes neutral, washed with an organic solvent such as acetone until the solvent is nor colored, and vacuum dried to obtain an electroconductive porous film according to chemical oxidation.

If desired, the above conductive porous film may be further impregnated with an aniline compound or a water-soluble salt thereof and oxidation-polymerized with said oxidizing agent in a protonic acid-containing reaction medium for a second time so as to cause a further amount of said conductive polymer to precipitate out on the porous film, followed again by rinsing and drying.

The resulting porous film can be compressed by means of a roll set to bring the conductive polymer into intimate contact with the film. Such a rolling operation serves also to adjust the thickness and pore size of the porous film. Moreover, such a rolling operation may be interposed between a first and a second deposition of the conductive polymer.

In the method described above, the electroconductivity of the electroconductive organic polymer obtained thereby has a close correlation with the composition of the reaction medium containing the protonic acid and the oxidizing agent wherein the oxidative polymerization of an aniline compound is conducted. In order to obtain a polymer having a high electroconductivity, selection of the composition of the above-described reaction medium is very important. In order to obtain the polymer having an electroconductivity exeeding $10^{-6}$ S/cm, it is necessary that the molar ratio of protonic acid/potassium dichromate in the reaction medium in which the reaction proceeds should exceed 1.2/1, and is preferably in the range of 2/1 to 50/1. Generally, under this oxidative polymerization condition, a polymer having a high electroconductivity on the order of from $10^{-6}$ to $10^1$ S/cm can be obtained.

In the method described above, the electroconductivity of the polymer produced is substantially constant when the molar ratio of protonic acid/potassium dichromate in the reaction medium in which the oxidative polymerization of an aniline compound is carried out is fixed. Thus, by this method, the polymer having a predetermined degree of electroconductivity can be obtained with high reproducibility. The amount of potassium dichromate relative to the aniline compound determines the yield of the polymer produced. The electroconductivity of the polymer produced, however, is not substantially affected by the amount of potassium dichromate used in the reaction. The porous film having a predetermined degree of electroconductivity, therefore, can be practically obtained in a constant yield when the aqueous solution of the oxidizing agent has a prescribed molar ratio of protonic acid/potassium dichromate and the potassium dichromate is used in at least an equivalent weight relative to the aniline compound.

The electroconductive porous film obtained by chemical oxidation generally has an appearance of a green to blackish green color due to the electroconductive aniline polymer formed. Generally, this green color gains in brightness as the degree of electroconductivity increases. However, the porous film when compressed by rolling generally has a glossy blue color.

The polymer of an aniline compound formed on the porous film by the chemical oxidation process, when its electrical conductivity is more than $10^{-6}$ S/cm, is insoluble in water and most organic solvents, and, particularly, is substantially insoluble in N,N-dimethylformamide but soluble in 97% concentrated sulfuric acid. This solubility characteristic of the polymer is remarkably different from that of emeraldine.

The conductive porous film according to this invention can also be obtained by the electro-oxidation process. In a solution containing an aniline compound and at least an equivalent of a protonic acid, the porous substrate film is held in contact with the ordinary positive electrode, such as a platinum electrode, and an electric current is passed to cause an electro-oxidation of the aniline compound thereof and thereby precipitate an electroconductive polymer on the porous film.

In this electro-oxidation process, too, the porous substrate film has sufficient porosity and wettability to let the solution of aniline compound flow through when the substrate film as a positive electrode is immersed in the solution.

The protonic acid used in this invention is preferably that having an oxidative potential higher than the oxidative potential used in this method. Preferred examples of protonic acids which meet this requirement include hydrochloric acid, hydrobromic acid, sulfuric acid, nitric acid, perchloric acid, tetrafluoroboric acid ($HBF_4$), hexafluorophosphoric acid ($HPF_6$). In order to produce an electroconductive organic polymer having a high electroconductivity exceeding $10^{-6}$ S/cm according to the present invention, it is necessary that the protonic acid should be used in at least an equimolar amount, generally 1 to 50 molar equivalents, relative to the aniline compound and, at the same time, the aniline compound solution should be subjected to the electro-oxidative polymerization at an electrode potential of at least +1 V relative to the standard calomel electrode. Further, the current density shculd be 0.01 mA/cm$^2$ to 1 A/cm$^2$. When the electro-oxidation potential is lower than +1 V or the current density is outside the above range, the resulting polymer has a low molecular weight and a low electroconductivity.

It is preferred that the concentration of the aniline compound in the aniline compound solution be 1% by weight or more. When the concentration is lower than 1% by weight, the resulting polymer tends to have lower molecular weight and lower electroconductivity. Although there is no upper limit in the concentration of the aniline compound in the aniline compound solution, the concentration up to about 50% by weight is generally preferred.

The solvent used in this method is preferably such that it dissolves both the protonic acid and the aniline compound and has stable decomposition potential at the oxidation potential used during the electro-oxidative polymerization. Preferred examples of the solvent include aliphatic lower alcohols such as methanol and ethanol, nitriles such as acetonitrile and benzonitrile, ketones such as methyl ethyl ketone, and amides such as N,N-dimethylformamide. Water has a decomposition potential of 1.23 V and, therefore, in some instances, it has a decomposition potential higher than the electro-oxidation potential used in the present invention. Thus, in this invention, even when water is used as a solvent, the oxidation polymer of the aniline compound having a high molecular weight and high electroconductivity can be produced by adjusting the electro-oxidation potential to +1 V or more.

As described previously, Mohilner et al. conducted the electro-oxidation of aniline at an oxidation potential of +0.8 V relative to SCE so as to avoid electrolytic decomposition of water. In accordance with this invention, an aniline polymer having a far higher molecular weight and a higher electroconductivity than those of emeraldine can be produced by carrying out the electro-oxidation at an electrode potential of +1 V or higher, preferably at an electrode potential in the range of 2 to 10 V.

In this invention, the current density used in the electro-oxidation is also an important factor. If the current density is less than 0.01 mA/cm$^2$, the polymer produced possesses a low molecular weight, probably in view of the fact that the polymer is soluble in dimethylformamide, and the resulting polymer has a lower electroconductivity.

In this invention, the aniline compound solution may additionally contain a supporting electrolyte other than the above-described protonic acid. Examples of the supporting electrolyte are metal salts of perchloric acid such as lithium perchlorate and sodium perchlorate and organic salts such as tetrabutyl ammonium perchlorate. Further, salts such as nitrates, sulfates, hydrochlorides, tetrafluoroborates, and hexafluorophosphates can be used as supporting electrolytes.

If desired, the conductive porous film produced as above may be immersed again in a solution containing aniline compound and at least a stoichiometric equivalent of a protonic acid so as to cause an electro-oxidation polymerization of aniline compound and a deposition of the resulting conductive polymer on the porous substrate film. Moreover, for the same purposes as stated hereinbefore, the electroconductive porous film may be subjected to the rolling operation described above. Further, this rolling operation may be interposed between a first and a second deposition of conductive polymer on the film.

The electroconductive porous film according to the present invention which is produced by the electro-oxidation, like the electroconductive porous film produced by the chemical oxidation, generally has the appearance of a green to blackish green color due to the electroconductive polymer formed by deposition. Generally, this green color gains in brightness as the degree of electroconductivity increases. However, the porous film when compressed by rolling generally has a glossy blue color.

The electroconductive polymer formed on the porous substrate film by the electro-oxidation process, like the polymer by chemical oxidation, has been doped with the protonic acid in the course of electro-oxidation, and the resulting electroconductive porous film generally has an electroconductivity within the range of $10^{-3}$ to $10^{-1}$ S/cm.

When the electroconductive polymer precipitated on the porous film by the electro-oxidation polymerization of aniline or alkylaniline has an electroconductivity of more than $10^{-3}$ S/cm, the polymer is insoluble in water and most organic solvents and, particularly, is substantially insoluble in 97% concentrated sulfuric acid, N,N-dimethylformamide and N-methyl-2-pyrrolidone.

The electroconductive porous film according to this invention can also be obtained by depositing an electro-oxidation polymer further on the electroconductive porous film obtained by the chemical oxidation process in an electrolytic cell using the very film as a positive electrode. The electroconductive porous film of this invention can also be obtained by conducting an electro-oxidation polymerization of an aniline compound using a positive electrode consisting of the electroconductive film according to the chemical oxidation process and an ordinary platinum or other electrode held in intimate contact with said film. The electroconductive porous film obtainable by a serial application of said chemical oxidation and electro-oxidation of an aniline compound to a porous substrate has particularly stable, high electroconductivity. Referring to this process, it is noted that the electroconductive porous film obtained by the chemical oxidation process has satisfactory wettability with respect to said solution of the aniline compound in the electro-oxidation process.

The electroconductive organic polymer obtained by the oxidative polymerization of an aniline compound according to this invention has already been doped with the protonic acid during the polymerization, and, therefore, it possesses a high electroconductivity without requiring an additional doping treatment. Furthermore, this electroconductivity is not altered even after the polymer has been allowed to stand in air for a long time. As compared to conventionally known doped electroconductive organic polymers, the polymer of this invention has high stability.

Thus, since the electroconductive porous film according to this invention is not only stable but also has a high electroconductivity, it can be advantageously laminated with a dielectric porous film of hydrophobic water-repellent resin such as fluororesin to provide a membrane for solute separation, as described, e.g., in Japanese Patent Application (OPI) No. 95502/83 (The term "OPI" means "published unexamined application"). It can also be advantageously used as an electroconductive porous film for solute separation by applying a high frequency voltage thereto so as to generate microwave vibrations as described, for example, in *Journal of Membrane Science*, 17, 219–227 (1984) on the membrane surface. It should be understood, however, that the conductive porous film according to this invention is by no means limited to these applications.

The following examples are further illustrative but by no means limitative of the invention.

EXAMPLE 1

Production of a Electroconductive Porous Polymer by Chemical Oxidation

In this example, for the purpose of identifying the chemical structure of the electroconductive polymer of aniline according to the chemical oxidation process and evaluating other physical properties of the polymer, aniline was oxidation-polymerized with a chemical oxidizing agent under the conditions defined in the text in the absence of a porous substrate film.

(1) Production of Polymer 45 g of water and 4 ml of concentrated hydrochloric acid were charged into a flask having a capacity of 300 ml, and 5 g (0.0537 mol) of aniline was dissolved therein to prepare an aqueous solution of aniline hydrochloride. The flask was then cooled with ice water.

Separately, an aqueous solution of oxidizing agent (molar ratio of protonic acid/potassium dichromate, 7.5/1) was prepared by adding 4.61 g (0.047 mol) of 97% concentrated sulfuric acid in 28.8 g of water and dissolving 1.84 g (0.00625 mol) of potassium dichromate therein. This solution was then added dropwise through a dropping funnel over a period of 30 minutes under stirring to the above aqueous solution of aniline hydrochloride cooled with ice water. During the first 2 to 3 minutes of the dropwise addition, the solution in the flask only colored a yellow color. Thereafter, a green solid was precipitated quickly, whereby the reaction solution turned into a blackish green color.

After completion of the dropwise addition, the reaction solution was stirred for additional 30 minutes. Then, the reaction mixture was poured into 400 ml of acetone, and the stirring was further continued for 2 hours. Then, the polymer formed in the reaction mixture was separated by filtration, washed by agitation in distilled water and separated by filtration. This washing procedure was repeated until the filtrate became neutral. Finally, the polymer separated by filtration was washed repeatedly with acetone until the filtrate was not colored. The polymer separated by filtration was vacuum dried over phosphorus pentoxide at room temperature for 10 hours to produce an electroconductive organic polymer as a green powder.

(2) Properties of the Polymer

The polymer obtained above was added to concentrated sulfuric acid having a 97% concentration at room temperature and stirred to determine the solubility. The amount of polymer dissolved therein was 1.2% by weight. A polymer solution in 97% concentrated sulfuric acid in a concentration of 5 g/dl was found to have a logarithmic viscosity number of 0.46 at 30° C. For comparison, the viscosity of emeraldine and Diamond Black were tested under the same conditions and found to have logarithmic viscosity numbers of 0.02 and 0.005, respectively.

Figure 5:
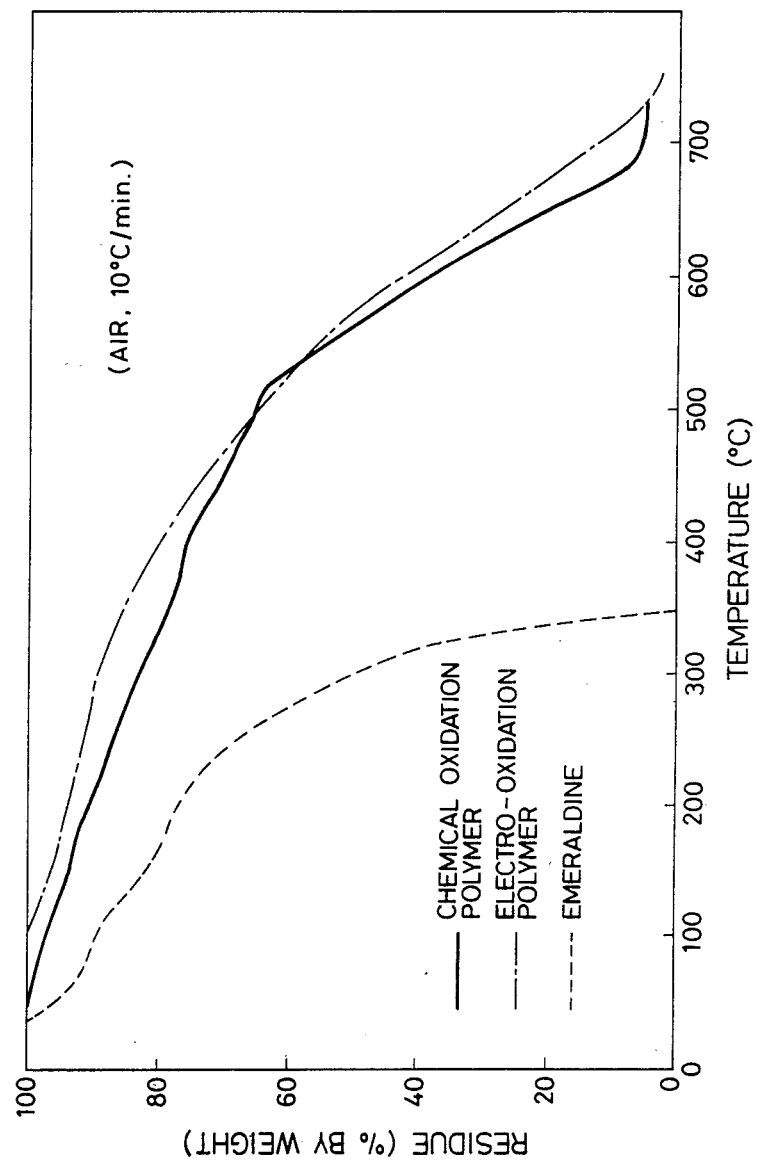
FIG. 5 shows the percentage residual weights of the aniline polymers obtained by chemical oxidation and electro-oxidation, respectively, and of emeraldine after heating.

The above polymer of this invention and emeraldine were subjected to thermogravimetric analysis in air. The results are shown in FIG. 5. The temperature increasing rate in the test was 10° C./minute.

Then, an about 120 mg portion of the polymer powder obtained above was pulverized in an agate mortar. The polymer powder was compression molded under pressure of 6,000 kg/cm$^2$ using a compression molder designed for the preparation of a tablet for the measurement by an infrared spectrophotometer to produce a disk 13 mm in diameter. With four copper foils about 1 mm in width applied fast on the four corners of the disk with silver paste or graphite paste, the disk was tested in the air for electroconductivity by the van der Pauw method (L. J. van der Pauw, *Philips Research Reports*, Vol. 13, No. 1, R334, February 1958). Thus, the electroconductivity was found to be 2.0 S/cm. This molded polymer showed substantially the same level of electroconductivity when measured under a vacuum of $10^{-2}$ Torr. When this disk was allowed to stand in the air for four months, the electroconductivity was not substantially altered.

In the following, the measurement of the electroconductivity of the electroconductive polymers and electroconductive porous films was carried out using the above-described 4-terminal method.

(3) Infrared Absorption Spectrum of Polymer

The infrared absorption spectrum of the polymer produced above is shown in FIG. 1. For comparison, the infrared absorption spectra of emeraldine and Diamond Black are shown respectively in FIG. 2 and FIG. 3. The emeraldine was prepared by the method described by A. G. Green et al. (A. G. Green et al., *J. Chem. Soc.*, Vol. 97, p. 2388 (1910)).

The infrared absorption spectrum of the polymer of this invention is similar to that of emeraldine, but, at the same time, differs widely in some respects. For example, in the absorption spectum of emeraldine, clear absorption by the deformation vibration outside the C-H plane due to the mono-substituted benzene is observed at 690 cm$^{-1}$ and 740 cm$^{-1}$. In the absorption spectrum of the polymer of this invention, however, this absorption is not substantially observed, and, instead, strong absorption at 800 cm$^{-1}$, indicating the presence of para-substituted benzene, is observed. This apparently occurs because the absorption due to the mono-substituted benzene at the terminal of molecule appears relatively strongly in the emeraldine which is a low molecular weight compound, whereas the absorption due to the para-substituted benzene forming a high molecular chain appears relatively strongly in the polymer of this invention which is a high molecular weight compound. In contrast, the infrared absorption spectrum of aniline black is markedly different from both the infrared absorption spectra of the polymer of this invention and the emeraldine. The difference is particularly apparent in the absorption of large width in the neighborhood of 3,200 to 3,400 cm$^{-1}$, the absorption apparently due to a quinolic carbonyl group at 1,680 cm$^{-1}$, the region of C-N stretching vibration at 1,200 to 1,300 cm$^{-1}$, and in the region below 600 cm$^{-1}$.

The assignment of the infrared absorption spectrum of the polymer of the present invention is as shown below: 1,610 cm$^{-1}$ (C=N stretching vibration at shoulder), 1,570 and 1,480 cm$^{-1}$ (C-C stretching vibration in benzene ring), 1,300 and 1,240 cm$^{-1}$ (C-N stretching vibration), 1,120 cm$^{-1}$ (absorption ascribable to dopant; absorption generated at substantially the same position without reference to the kind of dopant), 800 cm$^{-1}$ (deformation vibration outside C-H plane of para-substituted benzene), and 740 and 690 cm$^{-1}$ (deformation vibration outside C-H plane of mono-substituted benzene).

The infrared absorption spectrum of the polymer obtained by compensating the above-described polymer with ammonia is shown in FIG. 4 (B) and that of the polymer obtained by again doping the polymer of FIG. 4 (B) with 5 N sulfuric acid is shown in FIG. 4 (C). The spectrum of the polymer obtained by repeated doping is virtually identical with the spectrum of the initial polymer shown in FIG. 4 (A). The electroconductivity of the polymer obtained by repeated doping is the same as the initial polymer. The variation of the electroconductivity was 0.45 S/cm before the compensation (A), 1.6×10$^{-8}$ S/cm after the compensation (B), and 0.31 S/cm after the repeated doping (C). The data clearly indicate that the polymer of the present invention is doped with the protonic acid used during the course of the oxidative polymerization.

(4) Chemical Structure of Polymer

The electroconductive polymer produced as described above in accordance with this invention was subjected to elementary analysis. Even after this polymer was refined by washing with water and washing with acetone, green powder of anhydrous chromium oxide (Cr$_2$O$_3$) was recognized to remain as a residue after the elementary analysis. Thus, the measured values of elementary analysis are shown herein in conjunction with the values determined by calculation based on the total taken as 100. It is noted that the calculated values are well consistent with the theoretical values. The results obtained similarly with respect to the polymer chemically compensated with ammonia are also shown.

(a) Polymer containing sulfuric acid as dopant

| | C$_{12}$H$_8$N$_2$(H$_2$SO$_4$)$_{0.58}$ (repeating unit) | | |
|---|---|---|---|
| | Theoretical Values | Measured Values | Calculated Values |
| C | 60.79 | 58.11 | 60.99 |
| H | 3.89 | 4.05 | 4.25 |
| N | 11.81 | 10.80 | 11.34 |
| S | 7.84 | 7.45 | 7.82 |
| O | 15.66 | (14.87) | (15.61) |

The amount of sulfuric acid indicated in the theoretical formula was calculated based on the amount of sulfur actually measured in the polymer and the amount of oxygen was stoichiometrically calculated on the basis of the amount of sulfuric acid so determined. In the measured values above the amount of oxygen was calculated on the basis of the amount of sulfuric acid, which was calculated from the measured value of sulfur content.

(b) Compensated polymer

| | C$_{12}$H$_8$N$_2$ (repeating unit) | | |
|---|---|---|---|
| | Theoretical Values | Measured Values | Calculated Values |
| C | 79.98 | 73.24 | 79.77 |
| H | 4.48 | 4.34 | 4.73 |
| N | 15.54 | 14.23 | 15.50 |

EXAMPLE 2

Production of a Electroconductive Polymer by Electro-Oxidation

In this example, an electroconductive polymer was produced by the electro-oxidation process in the absence of a porous substrate film and the identification of its chemical structure and the evaluation of its physicochemical properties were carried out.

(1) Production of the Polymer

In an aqueous solution containing 10% by weight of aniline and hydrochloric acid in an equimolar amount relative to aniline, a platinum anode and a platinum cathode were inserted and electric current was passed between the electrodes for 8 hours at an initial electrode potential of +1.8 V relative to SCE and a fixed current density of 5 mA/cm$^2$ to effect electro-oxidative polymerization. (As is well known, the electrode potential increases gradually when the electro-oxidative polymerization is carried out at a fixed current density, and, therefore, the electrode potential is usually indicated by the initial potential as described above.)

The aniline polymer formed on the anode in the above reaction was separated, pulverized, washed by stirring in distilled water, and separated by filtration. The separated polymer was then washed with acetone. The polymer was vacuum dried over phosphorus pentoxide at room temperature for 10 hours to obtain an electroconductive organic polymer of this invention as a green powder.

Figure 6:
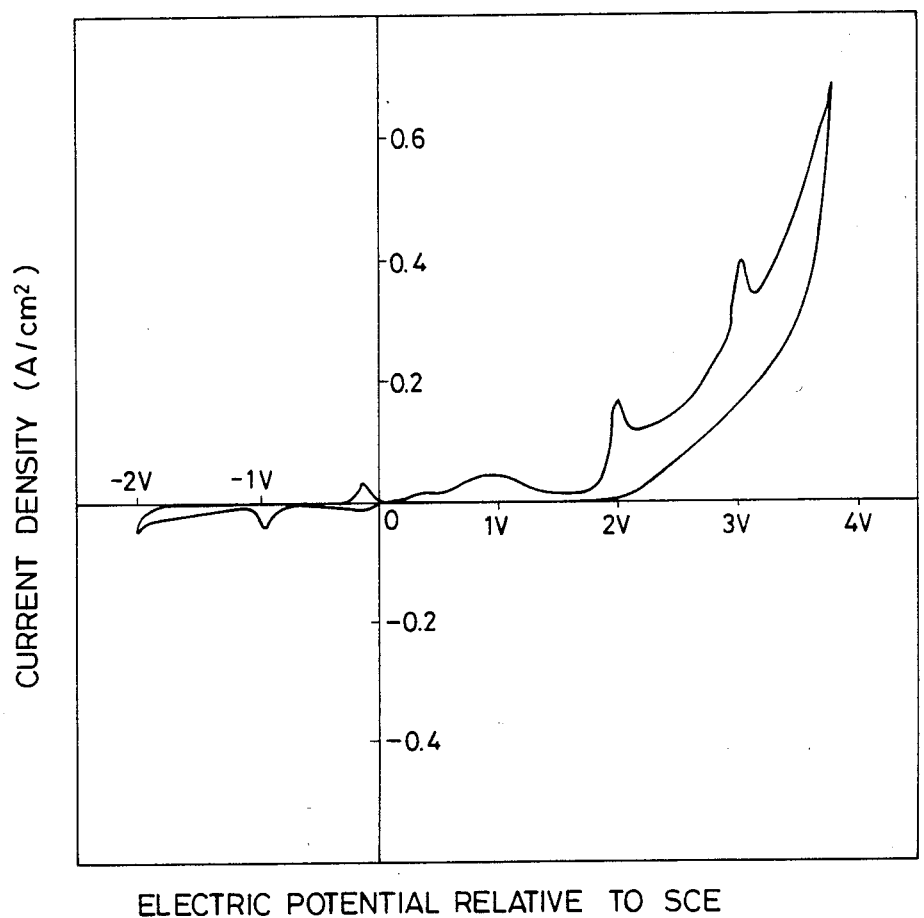
FIG. 6 is a cyclic voltamogram with respect to the electro-oxidation of aniline.
Figure 7:
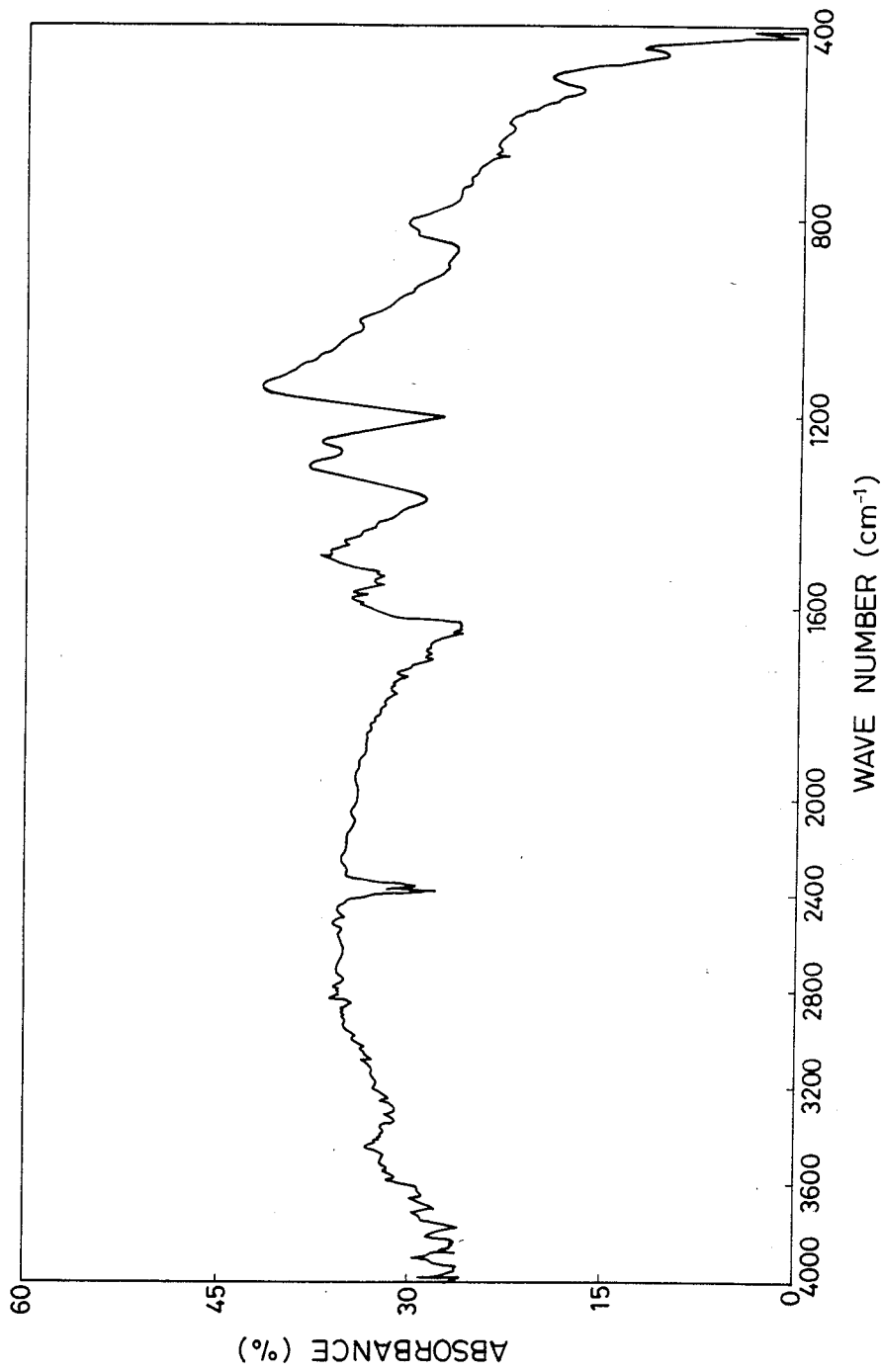
FIG. 7 is an infrared absorption spectrum of the electroconductive organic polymer of this invention obtained by electro-oxidation.

FIG. 6 shows the cyclic voltamogram in the electro-oxidation of aniline.

(2) Properties of the Polymer

The solubility of the polymer obtained above in sulfuric acid having 97% concentration at room temperature was determined and was found to be slightly low as compared with that of the polymer obtained by polymerization using chemical oxidation. However, the solubility was increased by ultrasonic treatment to a degree of 1% by weight. Since some insoluble solid material remained in the polymer solution, the solution was filtered through a glass filter to remove the insoluble material, and the filtrate was poured into a large volume of acetone to re-precipitate the polymer which was then separated by filtration, washed with water and dried to obtain a soluble portion of the polymer. The resulting polymer was again dissolved in 97% sulfuric acid at a concentration of 0.5 g/dl and a logarithmic viscosity number of the solution was determined at 30°

C. which was found to be 0.40. For comparison, the logarithmic viscosity number of emeraldine and Diamond Black was determined under the same conditions as described above and found to be 0.02 and 0.005, respectively.

Upon weighing the insoluble portion of the polymer remaining on the glass filter in the above-described procedure, it was found that the amount of this insoluble polymer is very small relative to the soluble portion of the polymer and does not substantially affect the polymer concentration value in the solution. Therefore, in subsequent Examples, the logarithmic viscosity was determined by a simplified method, i.e., with respect to a polymer solution obtained by dissolving the polymer in 97% concentrated sulfuric acid at a concentration of 0.5 g/dl and removing a very small amount of insoluble material from the solution of filtration. Strictly speaking, the logarithmic viscosity number in subsequent Examples was determined with respect to a polymer solution having a polymer concentration slightly lower than 0.5 g/dl since a small amount of insoluble polymer had been removed from the polymer solution, but the difference in the determined viscosity values is substantially on a negligible order. Further, the viscosity determined by this simplified method ensures the minimum viscosity value because this viscosity value is always lower than that determined with respect to a polymer solution having a concentration of exactly 0.5 g/dl of the re-precipitated soluble polymer. Thus, when the logarithmic viscosity of the polymer determined by this simplified method is 0.1 or more at a concentration of 0.5 g/dl at 30° C., the solution of the re-precipitated polymer must also have a logarithmic viscosity number of 0.1 or more when determined under the same concentration and temperature and thus satisfies the requirement of the present invention.

The cyclic voltamogram in the electro-oxidation of aniline is shown in FIG. 6.

Further, the above-described polymers of this invention obtained by chemical oxidation and by electro-oxidation and emeraldine were subjected to thermogravimetric analysis in air. The results obtained are shown in FIG. 5. The rate of temperature increase was 10° C./minute.

About 120 mg of the polymer powder obtained above was molded into a disk in the same manner as Example 1 and its electroconductivity was measured by the method of van der Pauw. The value was 4.1 S/cm. The disk showed nearly the same electroconductivity value as above when determined in a vacuum of $10^{-2}$ Torr. Allowing the disk to stand in air for 4 months caused substantially no change in the electroconductivity.

(3) Infrared Absorption Spectrum of the Polymer

Figure 8:
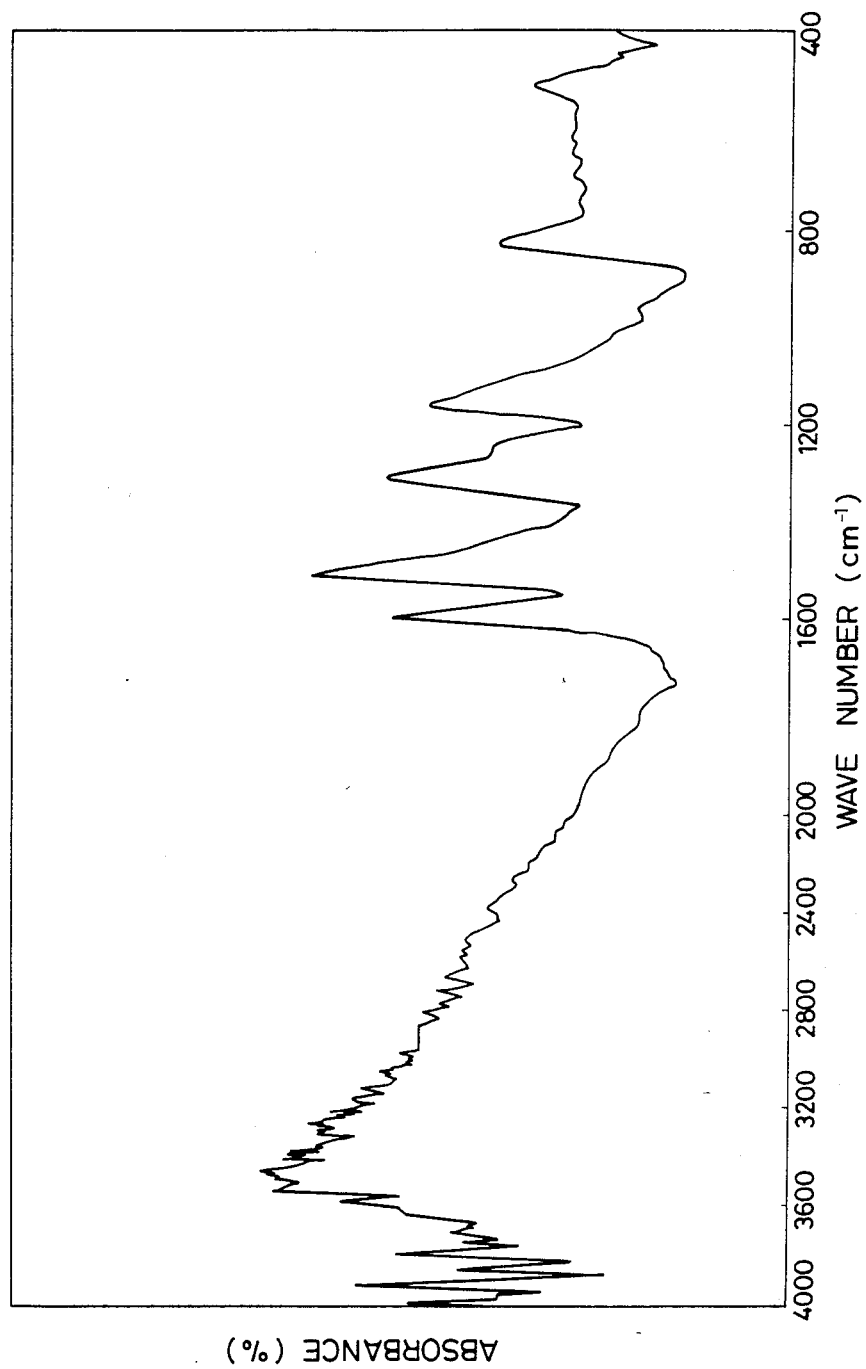
FIG. 8 is an infrared absorption spectrum of the polymer of this invention prepared by electro-oxidation which has been compensated with ammonia.

The infrared absorption spectrum of the above polymer is shown in FIG. 8. It is in substantial agreement with the infrared absorption spectrum of FIG. 1, indicating that the electroconductive polymer according to the electro-oxidation process is substantially the same as the electroconductive polymer according to the chemical oxidation process.

Figure 9:
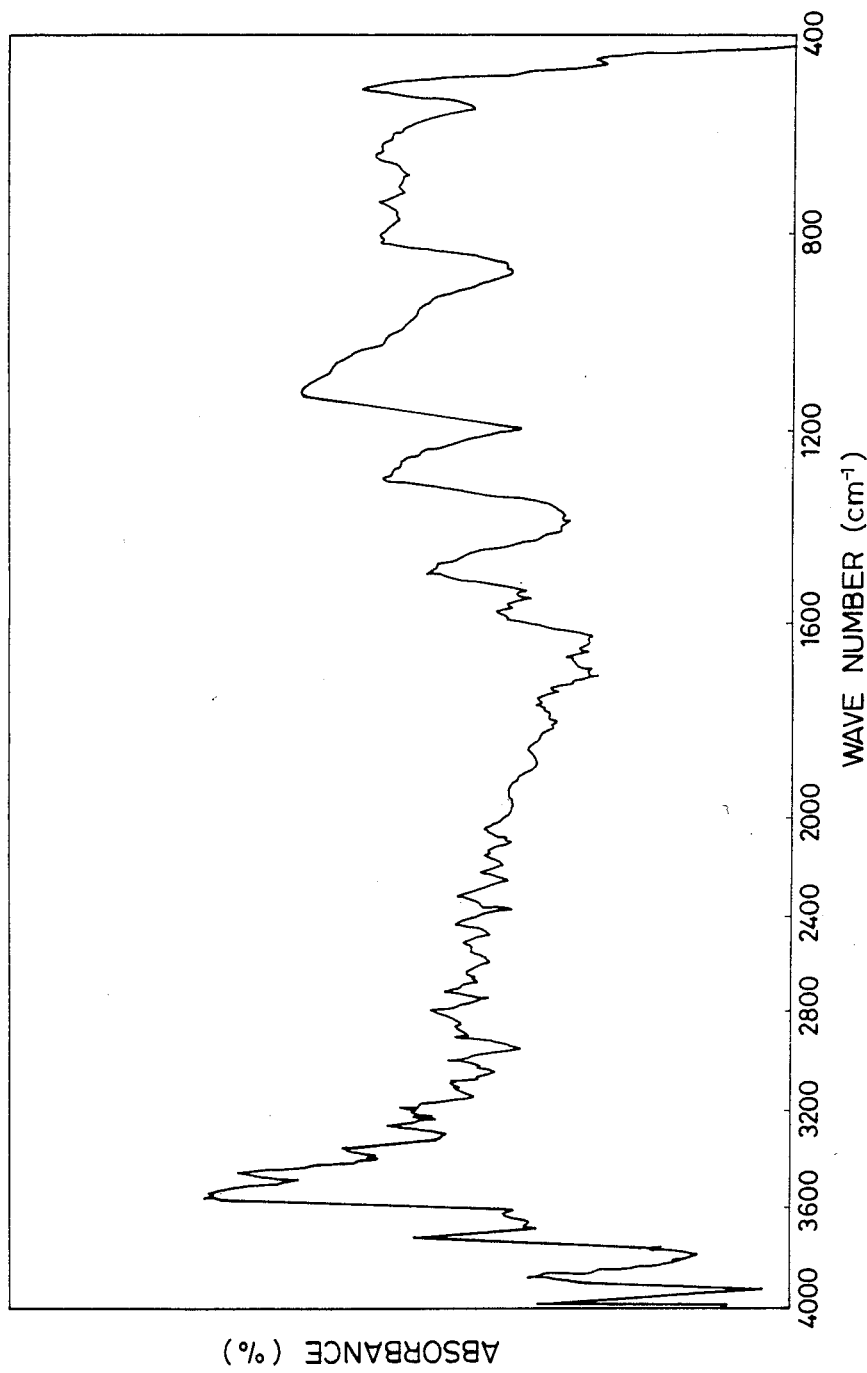
FIG. 9 is an infrared absorption spectrum of the polymer compensated with ammonia and re-doped with hydrochloric acid.

FIG. 9 shows the infrared absorption spectrum after ammonia compensation (electroconductivity $2.3 \times 10^{-8}$ S/cm) of the above polymer (electroconductivity 4.1 S/cm), and FIG. 10 shows the infrared absorption spectrum of the same polymer after redoping with 5 N hydrochloric acid (electroconductivity 1.21 S/cm). This post-redoping spectrum appears to be substantially identical to the initial spectrum shown in FIG. 8 and approximately equivalent to that prior to ammonia compensation. It is, therefore, clear that the electroconductive polymer obtainable by the electro-oxidation process according to this invention has been doped with a protonic acid in the stage of electro-oxidation polymerization.

(4) Chemical Structure of the Polymer

The elemental analysis of the above electroconductive polymer according to the electro-oxidation process is shown below.

The results obtained similarly with respect to the polymer chemically compensated with ammonia are also shown.

(a) Polymer containing hydrochloric acid as dopant

| | $C_{12}H_8N_2(HC)_{1.5}$ (repeating unit) | |
|---|---|---|
| | Theoretical Values | Measured Values |
| C | 61.36 | 60.86 |
| H | 4.08 | 4.18 |
| N | 11.92 | 11.61 |
| C | 22.64 | 22.15 |

The amount of hydrochloric acid indicated in the theoretical formula was calculated based on the actually found amount of chlorine in the polymer.

(b) Compensated polymer

| | $C_{12}H_8N_2$ (repeating unit) | |
|---|---|---|
| | Theoretical Values | Measured Values |
| C | 79.98 | 79.54 |
| H | 4.48 | 4.88 |
| N | 15.54 | 15.02 |

The following examples illustrate production processes for preparing electroconductive porous film according to this invention.

EXAMPLE 3

A porous polytetrafluoroethylene film (Daikin Kogyo K.K., Polyflon Paper ®) was immersed in a 10 wt % solution of aniline hydrochloride in ethanol at room temperature for 30 minutes, at the end of which time it was taken out and dried at 60° C. for 30 minutes. The film was further immersed in an $H_2SO_4$-acidic aqueous solution of potassium dichromate (potassium dichromate-sulfuric acid-water=5:15:75 (w/w); molar ratio of protonic acid/potassium dichromate=9.0) at 25° C. for 10 minutes. By this procedure the aniline was oxidation-polymerized and the polymer deposited on the porous resin film.

The above porous film was rinsed with water and washed with acetone. This procedure was repeated until the acetone wash was colorless and clear. Then, the film was dried at 60° C. for 1 hour to give an electroconductive porous film haveing an electroconductivity of $5.5 \times 10^{-3}$ S/cm. The electroconductivity of this electroconductive film was determined by the four-terminal method (the same applies hereinafter).

Then, the above electroconductive porous film was immersed as a positive electrode in a 10 wt % aqueous solution of aniline hydrochloride alongside a negative electrode, and a current was passed at an initial electrolytic potential of +2 V (SCE) and a constant current density of 10 mA/cm², whereby an electroconductive polymer of aniline was further deposited on the porous film. Thereafter, the film was rinsed in distilled water with stirring, and then washed with acetone. The film was further dried in vacuo over phosphorus pentoxide at room temperature for 10 hours to give an electroconductive porous film according to this invention. This film showed an electroconductivity of $2.0 \times 10^{-1}$ S/cm.

EXAMPLE 4

The procedure of Example 3 was repeated except that a porous polysulfone film (Nitto Electric Industrial Co., Ltd., NTU-3100) was used. The procedure gave a porous film having an electroconductivity of $1.7 \times 10^{-1}$ S/cm.

EXAMPLE 5

The procedure of Example 3 was repeated except that a porous polyimide film (Nitto Electric Industrial Co., Ltd.) and an $H_2SO_4$-acidic aqueous solution of potassium dichromate (potassium dichromate-sulfuric acid-water=10:25:80 (w/w), protonic acid/potassium dichromate (mole ratio)=7.5) were employed. After this oxidative polymerization of aniline, an electro-oxidation polymer of aniline was further deposited to give a porous film having an electroconductivity of $2.5 \times 10^{-1}$ S/cm.

EXAMPLE 6

A porous polypropylene film (Polyplastic Co., Ltd.; Duraguard ®) was immersed in a 10 wt % solution of aniline hydrochloride in ethanol at room temperature for 30 minutes, and then dried at 60° C. for 30 minutes. Then, the film was immersed in an $H_2SO_4$-acidic aqueous solution of potassium dichromate (potassium dichromate-sulfuric acid-water=5:15:75 (w/w), protonic acid/potassium dichromate (mole ratio)=9.0) at 25° C. for 10 minutes, whereby the aniline was oxidation-polymerized and deposited on the porous film.

The porous film was rinsed with water and washed with acetone. This procedure was repeated until the acetone wash was colorless and clear. The film was then dried at 60° C. for 1 hour. The above procedure was repeated 3 times to give an electroconductive porous film according to this invention. This film had an electroconductivity of $5.5 \times 10^{-3}$ S/cm.

EXAMPLE 7

The procedure of Example 6 was repeated except that a porous ethylene-vinyl alcohol copolymer film was employed to produce an electroconductive porous film. This film had an electroconductivity of $3.4 \times 10^{-2}$ S/cm.

EXAMPLE 8

The procedure of Example 6 was repeated except that a porous polyetrafluoroethylene film (Daikin Kogyo K.K., Polyflon Paper ®) was immersed in a 10 wt % solution of aniline hydrochloride in ethanol. The procedure gave an electroconductive porous film having an electroconductivity of $9.2 \times 10^{-2}$ S/cm.

EXAMPLE 9

The procedure of Example 6 was repeated except that a porous polytetrafluoroethylene film sputter-etched in water vapor at $1 \times 10^{-2}$ Torr, a discharge voltage of 100 W and a discharge time of 30 seconds, was employed as the substrate film. The procedure gave a porous electroconductive film having an electroconductivity of $3.4 \times 10^{-4}$ S/cm.

EXAMPLE 10

The procedure of Example 6 was repeated except that a corona discharge treatment (applied voltage 10 KV) was carried out in air with a gap of 1 mm for 30 minutes. The procedure gave a porous electroconductive film having an electroconductivity of $7.5 \times 10^{-5}$ S/cm.

EXAMPLE 11

A positive and a negative electrode of platinum metal were set in a 10 wt % aqueous solution of aniline hydrochloride and a polyetrafluoroethylene film (Daikin Kogyo K.K., Polyflon Paper ®) pretreated with sodium metal (Junko-sha K.K.) was set in intimate contact with the positive electrode. Then, a current was passed at an initial electrolytic potential of +2.2 V (SCE), a constant current density of 10 mA/cm² for 1 hour to deposit a electroconductive aniline polymer on the porous substrate film.

Then, the film was washed in distilled water with stirring, and then washed with acetone. The washed film was dried in vacuo over phosphorus pentoxide at room temperature for 10 hours to give an electroconductive porous film according to this invention. This film had an electroconductivity of $2.5 \times 10^{-1}$ S/cm.

While the invention has been described in detail and with reference to specific embodiments thereof, it will be apparent to one skilled in the art that various changes and modifications can be made therein without departing from the spirit and scope thereof.

What is claimed is:

1. An electroconductive porous film comprising a porous film substrate having deposited thereon an electroconductive organic polymer containing an electron acceptor as a dopant, said polymer being a substantially linear polymer having as a main repeating unit thereof a quinonediimine structure represented by formula (III)

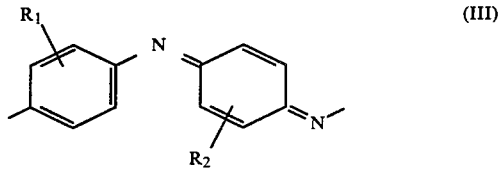

wherein $R_1$ and $R_2$, which are the same or different, each represents a hydrogen atom or an alkyl group.

2. An electroconductive porous film as in claim 1, wherein said electroconductive organic polymer has an electroconductivity of not less than $10^{-6}$ S/cm.

3. An electroconductive porous film as in claim 1, wherein said film has an electroconductivity of not less than $10^{-6}$ S/cm.

4. A process for producing an electroconductive porous film comprising a porous film substrate having deposited thereon an electroconductive organic polymer containing an electron acceptor as a dopant, comprising contacting a porous film substrate impregnated with an aniline compound or its water-soluble salt with a reaction medium containing a protonic acid and an oxidizing agent, oxidation-polymerizing the aniline compound or its water-soluble salt thereof to form and deposit on the porous film an electroconductive organic polymer being a substantially linear polymer having as a main repeating unit thereof a quinonediimine structure represented by formula (III).

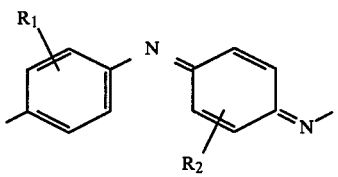

(III)

wherein $R_1$ and $R_2$, which are the same or different, each represents a hydrogen atom or an alkyl group.

5. A process as in claim 4, wherein said aniline compound is aniline or an alkyl aniline.

6. A process as in claim 4, wherein said protonic acid is sulfuric acid.

7. A process as in claim 4, wherein said oxidizing agent is potassium dichromate.

8. A process as in claim 4, wherein the molar ratio of protonic acid/potassium dichromate in said reaction medium containing said oxidizing agent is not less than 1.2/1.

9. A process for producing an electroconductive porous film comprising a porous film substrate having deposited thereon an electroconductive organic polymer containing an electron acceptor as a dopant, comprising immersing the porous film substrate in a solution of an aniline compound or its water-soluble salt containing at least an equivalent of a protonic acid in contact with a positive electrode, electro-oxidation-polymerizing the aniline compound or its water-soluble salt to deposit on the porous film substrate an electroconductive organic polymer being a substantially linear polymer having as a main repeating unit thereof a quinonediimine structure represented by formula (III).

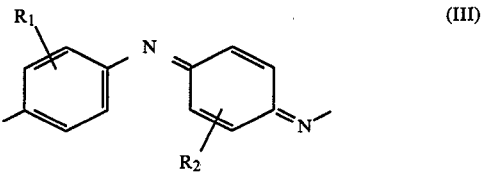

(III)

wherein $R_1$ and $R_2$, which are the same or different, each represents a hydrogen atom or an alkyl group.

10. A process as in claim 9, wherein said solution of aniline compound or its water-soluble salt is electro-oxidative polymerized at an electrode potential of at least $+1$ V relative to the standard calomel electrode, at a current density in the range of 0.01 mA/cm$^2$ to 1 A/cm$^2$.

11. A process as in claim 10, wherein said aniline compound is aniline or an alkyl aniline.

12. A process as in claim 10, wherein said electrode potential is in the range of 2 to 10 V.

13. A process as in claim 10, wherein said aniline solution contains the aniline compound at a concentration of 1 to 50% by weight.

* * * * *